Feb. 9, 1932.   J. A. BALL   1,844,377
COLOR CINEMATOGRAPHY
Filed Aug. 21, 1929

Inventor
Joseph A. Ball
by Roberts, Cushman & Woodbury
his Attorneys

Patented Feb. 9, 1932

1,844,377

UNITED STATES PATENT OFFICE

JOSEPH A. BALL, OF LOS ANGELES, CALIFORNIA, ASSIGNOR TO TECHNICOLOR MOTION PICTURE CORPORATION, OF BOSTON, MASSACHUSETTS, A CORPORATION OF MAINE

COLOR CINEMATOGRAPHY

Application filed August 21, 1929. Serial No. 387,417.

In the art of cinematography it has long been standard practice to make the pictures on the film approximately one inch long (transversely of the film) and approximately three-quarters of an inch wide (longitudinally of the film). However, for various purposes it has been found desirable to change the proportions of the pictures, increasing the ratio between length and width, and to this end it has been proposed to increase the width of the film from thirty-five millimeters to the order of fifty-six millimeters. While this is a simple change in black-and-white cinematography, involving merely a change in dimensions, satisfactory results cannot thus be obtained in color cinematography involving light-dividing means for dividing the main beam of light from the object-field into component beams for exposing the respective negative films to different color aspects respectively, particularly in three-color work, chiefly for the reason that the necessary increase in film width makes it impossible to nest or group the films closely together in the region of the exposure apertures, thereby rendering it impossible to use lenses having relatively great depth of focus at larger apertures which are essential for most types of color cinematography.

The principal object of this invention is to provide a method of making cinematographic pictures of the long narrow type, in color, which permits the use of short focus lenses and which is otherwise superior to the obvious method of increasing film width.

While the invention may be practiced with various kinds of light-dividing means (for example such as disclosed in Patents 1,497,356 and 1,460,706 and applications Serial No. 351,885 filed April 2, 1929, Serial No. 369,073, filed June 7, 1929, Serial No. 371,151, filed June 15, 1929, and Serial No. 375,900 filed July 5, 1929), for the purpose of illustration preferred means are shown in the accompanying drawings in which Fig. 1 is an elevation, showing parts in section;

In the particular embodiment of the invention chosen for the purpose of illustration RN, GN and BN represent three cinematographic films which feed along paths perpendicular to the paper and upon which the red, green and blue records are formed respectively, 1, 2 and 3 representing filters for transmitting the desired components of light to the respective films; O represents the objective lens; and R" and R' two partial reflectors for dividing the main beam entering along optical axis A into three component beams incident to the three films along branch paths R, G and B. The proportions of light transmitted or reflected to the respective films will of course depend upon the characteristics of the film and filters employed, the character of the scene, the judgment of the photographer, etc., and the reflectors will be constructed accordingly.

Figure 1:
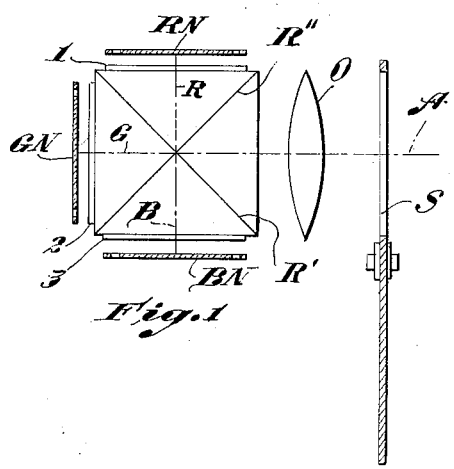

To obstruct all light during each intermittent advancement of the films (which are preferably advanced simultaneously) a shutter S is provided at a suitable location in the optical path, as for example immediately in front of the lens O as shown in Fig. 1. This shutter may be of the usual type having an exposure opening of any desired angular extent.

Figure 2:
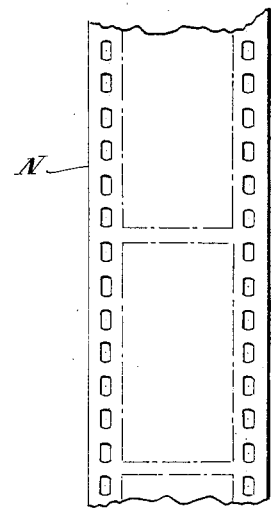
Fig. 2 is a face view of one of the exposed films.

According to one aspect of this invention the films are exposed with the long dimensions of the pictures extending lengthwise of the film, as shown in Fig. 2. Inasmuch as the long dimensions should ordinarily be horizontal on the screen, the camera would therefore be positioned with the three films feeding horizontally instead of vertically in the exposure regions. In this way the films may be grouped more closely together than in case the long dimensions of the pictures extend transversely of the film, thereby permitting the use of lenses having relatively great depth of focus at larger apertures; and the desired increase in proportionate length of the pictures may if desired be effected with standard width film.

From the foregoing it will be evident that the main beam of light focused by lens O is divided by reflectors R" and R' into three component beams incident to the respective films RN, GN and BN at right angles, the axes of all the beams lying approximately in the same plane (exactly the plane of the paper in Fig. 1), that the films feed transversely of this plane across the axes of the component beams, and that each film is exposed with the long dimension of the pictures extending transversely of this plane. While the ratio of the length and width of each picture may be varied within the scope of the invention in its broader aspect, the ratio is preferably of the order of two to one.

A characteristic feature of the invention, in its more specific aspect, consists in the method of forming elongate pictures by dividing the main beam in the angular space between the films so that the long dimensions of the pictures extend transversely of the plane of the axes of the component beams, whereby the films may be closely nested to permit the use of lenses having great depth of focus at larger apertures. As shown in Fig. 1 this space is preferably square (the films defining three sides of the square) but the films would of course define a different polygonal outline if the reflectors were disposed at an angle other than a right angle.

Figure 3:
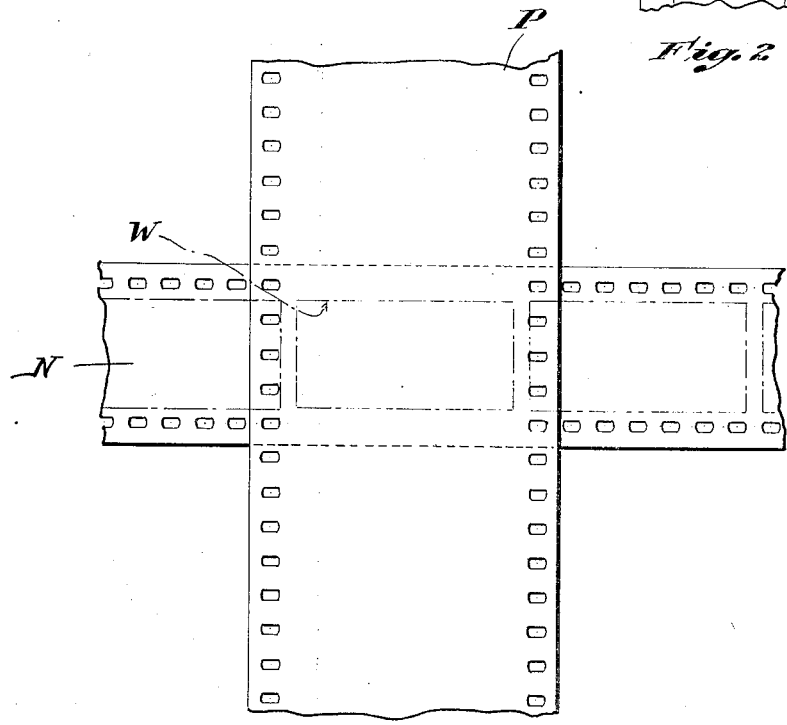
Fig. 3 illustrates one method of printing positives from the negatives.

It will of course be understood that colored positives may be formed from the three negatives in various ways, as for example by using the three positives printed from the negatives respectively as printing matrices to form the composite color pictures by imbibition. However, irrespective of the method employed to form the colored positives, the long dimension of the pictures preferably extends transversely of the positive film so that the film may be fed vertically through the projector. Consequently in printing the positives (or the aforesaid matrices) the negatives are preferably fed transversely of the positives with the positive stock wide enough to accommodate the long dimension of the pictures, as illustrated in Fig. 3. Between successive printings the positive P and negative N are of course fed vertically and horizontally distances equal to or slightly greater than the width and length of the pictures, respectively, by any suitable film advancing means disposed in advance of the overlapping portions of the films along the paths of the films respectively. While any suitable contact or projection printing mechanism may be used, in the case of contact printing the films should of course be slightly separated throughout their overlapping areas during intermittent advancement and the long dimension of the sprocket holes preferably extend longitudinally of one film and transversely of the other film (longitudinally of the negative and transversely of the positive, as shown in Fig. 3 for example) so that the usual registering pin or pins of the printer may cooperate with the sprocket holes of the superposed portions of the film without requiring separate registering openings.

I claim:

1. The method of producing cinematographic pictures which comprises dividing a main beam of light from the object-field into a plurality of component beams with the axes of all the beams approximately in the same plane, feeding a plurality of films transversely of said plane across the axes of the component beams respectively, and concomitantly exposing said films in areas whose greater dimensions are transverse to said plane.

2. The method of producing cinematographic pictures which comprises feeding a plurality of films transversely of a plane with the films angularly disposed transversely of each other to define an angular space therebetween, in said space dividing a main beam of light from the object-field into component beams perpendicularly incident to the films respectively, and concomitantly exposing said films in areas whose greater dimensions are transverse to said plane.

3. The method of producing cinematographic pictures which comprises feeding a plurality of films transversely of a plane with the films angularly disposed transversely of each other to define a right-angle space therebetween, in said space dividing a main beam of light from the object-field into component beams perpendicularly incident to the films respectively, and concomitantly exposing said films in areas whose greater dimensions are transverse to said plane.

Signed by me at Los Angeles, California, this 22nd day of July, 1929.

JOSEPH A. BALL.